INVENTOR.
Wataru Ishibashi

United States Patent Office 3,513,044
Patented May 19, 1970

3,513,044
METHOD FOR THE PRODUCTION OF A HIGH ENERGY FUEL EMPLOYING ELECTRIC SPARK DISCHARGE
Wataru Ishibashi, Nosu, Japan, assignor to Iwatani & Co. Ltd., Osaka, Japan
Filed Sept. 27, 1967, Ser. No. 670,872
Int. Cl. C06b 15/00
U.S. Cl. 149—87                                    12 Claims

ABSTRACT OF THE DISCLOSURE

A method for the production of jet and rocket engine fuels, which comprises the steps of comminuting metals, alloys thereof or carbon into particles or pellets preferably of uniform sizes, and simultaneously dispersing them in liquid hydrocarbon into a mixture. Electric spark discharges are induced by pairs of electrodes in the mixture among the pellets, whereby the pellets are cracked into gases and carbon particles until dispersions occur.

FIELD OF THE INVENTION

The present invention relates to a method for the production of high-energy fuels for jets and rocket engines and, more particularly, to a method for the production of high-energy fuels consisting in dispersions of metallic substances in liquid hydrocarbons. More particularly, the invention relates to a method for producing high-energy fuels, which comprises comminuting metals such as lithium, beryllium, carbon, sodium, magnesium, aluminum, silicon and the like and, simultaneously, uniformly dispersing the resulting metal particles in hydrocarbon fuels.

DESCRIPTION OF THE PRIOR ART

Conventional jet and rocket engine fuels take the form of slurries which consist in suspensions of finely divided metals such as magnesium alloy and intermetallic compounds in liquid hydrocarbons such as benzene, toluene, etc., light petroleum fractions such as gasoline, kerosene, and diesel fuels, liquid fuel oils which are conventionally used as jet aircraft fuels and the like. Typical of such high energy slurry fuels have recently attracted much attention as high-calorie, high specific thrust fuels (the term "specific thrust" means a thrust per unit weight of a propellant burnt per second).

More recently, various light metals carrying comparatively small atomic numbers on the Periodic Table of the Elements have been used as components of such propellants, because of their high calorific values and high specific thrusts.

The following table shows the calorific values, which govern the combustion temperatures, for some of the elements located in the upper left section of the Periodic Table. It can be said that the elements outside of the section may be disregarded as fuel constituents.

The values tabulated are the calorific values with respect to oxygen, and due to the differences in density among those elements, there arises substantial differences between the calorific value per unit weight and the value per unit volume. Since the amount of oxygen required for complete oxidation varies from one element to another, the above table shows the calorific value per unit weight which represents the sum of the weight of the fuel and the weight of the oxygen required. Under the circumstances, where it is impossible to utilize the oxygen contained in the atmosphere, no other comparison makes sense.

JP in the table means the JP fuel which typifies the petroleum jet fuel. It will be apparent from the values given in the table that the metal elements which can be effectively used as propellant fuels are located in the upper left portion of the Periodic Table of the Elements.

It is to be understood, however, that those metals are so reactive that they cannot easily be handled. By way of example, a conventional method comprises mechanically comminuting metals by means of a ball mill and, then, dispersing the resulting finely divided metals in hydrocarbon fuels. In this method, it is necessary that prior to the mixing and dispersing, the metal powders be protected against degradation, oxidation, caking and other troubles. It is also necessary to pay attention to the toxic effect of certain metals such as Be and Li. Since the metal powders can be dispersed in larger quantities into fuels and a higher stability of the suspension is obtained when the metals are small in size, it is desirable that the metals be of sufficiently small size, i.e. usually below 1 micron and preferably from 0.1 to 0.5 micron.

In addition to the foregoing conditions, it is essential that the metals be uniformly dispersed and that the resulting dispersions be stable against aging. Aside from the above technique, some of the conventional methods for comminuting metals and dispersing the same into fuels will be described. First, there may be mentioned a method which consists of melting a metal and spraying the molten mass under pressure and in an inert gaseous atmosphere. This method is disadvantageous in that it is difficult to reduce the metals to sizes less than 5 microns. Another known method comprises quenching a metal vapor to obtain a powder, in which about 50% of the particles are less than 1.5 microns in diameter, and washing and trapping the particles directly with a hydrocarbon fuel. In this method, since metals are evaporated by heating under reduced pressure, there is much to be desired equipmentwise. In both respects of operation and equipment, the metals which give off toxic vapors or the metals which are evaporated only at high temperatures (Si—2300° C.: Li—1370° C.: Be—2770° C.: Mg—1110° C.: and Al—2060° C.) are especially difficult to work with.

An alternative method comprises the steps of reducing a metal oxide with magnesium at high temperature and admixing the reduced metal into a hydrocarbon fuel in such a manner that the metal is not oxidized. This technique yields a powder, the grain size of which measures from about 1 to 2 microns at the time of reduction, but as characteristic of a finely divided powder, it is liable to cake at high temperature and, if that occurs, the cake must be redisintegrated. Those powders, prepared by the conventional techniques, are incorporated in liquid hydrocarbon fuels in amounts ranging from 50 to 60 percent by weight, and in order to improve the dispersing property, as well as the fluidity, of the powders, surface active agents and other additives are employed.

Thus, in the conventional art, metal powders are prepared separately (inclusive of the case in which a metal is disintegrated in the form of a mixture with a liquid hydrocarbon) and, then the resulting powder is uniformly dispersed in a liquid hydrocarbon fuel. Stated differently, the conventional techniques invariably require at least

|         | $H_2$  | Li     | Be     | B      | C      | Na     | Mg     | Al     | Si     | JP     |
|---------|--------|--------|--------|--------|--------|--------|--------|--------|--------|--------|
| $K_{cal}/Kg$ | 28,600 | 10,300 | 16,200 | 13,800 | 7,850  | 2,610  | 5,880  | 7,350  | 7,220  | 10,300 |
| $K_{cal}/L$  | 260    | 5,500  | 29,800 | 32,300 | 17,300 | 25,300 | 10,200 | 19,700 | 16,900 | 7,900  | two steps of operation. Furthermore, it is difficult, by those known techniques, to produce a fine metal powder, the grain size of which is less than 1 micron, in an efficient and effective manner.

SUMMARY OF THE INVENTION

The method of the present invention represents a further step forward from the inventions which relate to the production of microfine powders of electroconductive metals and alloys, the average grain size of said powders being less than 1 micron in a liquid dielectric. In the present application, metals are disintegrated in liquid hydrocarbon fuels without exposing the metals to the atmosphere and while the metals are finely divided, they are simultaneously dispersed into the hydrocarbon fuels.

Then, the present invention is concerned with a method for the production of metal-containing high energy fuels, which comprises disposing pairs of electrodes in a liquid hydrocarbon fuel which is to be a component of the desired high energy fuel, placing metal pellets, which are to be components of said high energy fuel, in the above-mentioned liquid hydrocarbon fuel and impressing a spark discharge voltage across the electrodes, whereby an intermittent series of spark discharges are induced in the interstices among the coarse metal pellets in the liquid hydrocarbon fuel, the resulting energy of impact serving to scrape fine metal particles off the surfaces of the pellets, simultaneously, disperse the particles uniformly into the medium.

DESCRIPTION OF THE PREFERRED EMBODIMENTS

Figure 1:
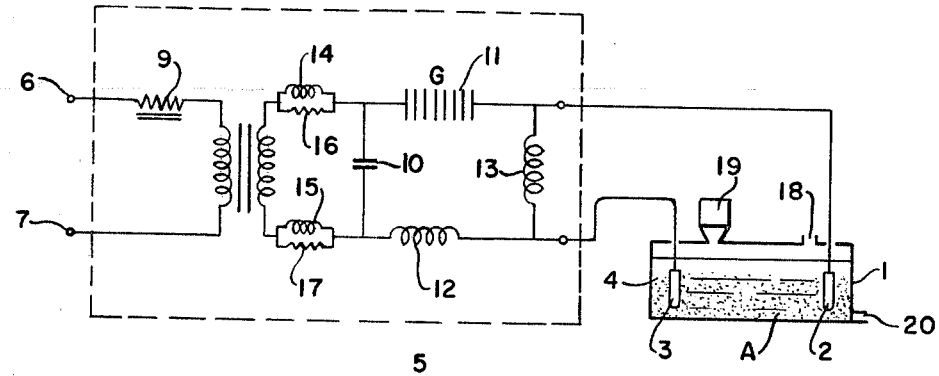
FIG. 1 is a typical example of the equipment to be employed in the method of this invention.

The invention will now be described in further detail. Thus, a reactor in which pairs of electrodes are disposed is charged with a reaction medium which as aforesaid is a liquid hydrocarbon and, then, pellets of a metal, which is to be a component of the desired metal fuel, is put in the hydrocarbon medium. While the metal pellets come into contact with the electrodes and also with each other, they are actually held in contact through the intermediary of thin films of said hydrocarbon medium. When a spark discharge voltage is impressed across the pairs of electrodes, a repeated series of spark discharges is intermittently induced in the gaps among the metal pellets which as aforesaid are held adjacently of each other through films of the fuel hydrocarbon.

The high energy of impact, resulting from the discharges, scrapes microfine metal particles off the surfaces of the metal pellets, and the metal particles are simultaneously dispersed in the hydrocarbon medium. The abovementioned spark discharges take place extensively among the metal pellets. Stated differently, the discharges occur three-dimensionally in the reactor. Since the coarse grains are caused by the impact of the discharge to move vigorously and, accordingly, the sparking points are also caused to charge in location, there can be no short-circuits which otherwise would occur due to the fusion of the metal grains.

Thus, this reaction proceeds without hindrances. Accordingly, the metal pellets are uniformly corroded electrically from their surfaces, and as the grains are thus disintegrated, they remain substantially spherical in shape. The grains, when rounded into spheres, serve to smooth the movement of the grains and to stabilize the discharge. In order that the spark discharge is repeatedly induced, the discharge voltage is preferably a pulse voltage.

One of the features of the present method is that the metal powder obtainable thereby consists of extremely fine particles ranging from 1 to 0.01 micron. The grain size of the metal powder is correlated with the discharge voltage, the cut-number or the frequency of the spark discharge, the resistance of the medium, and the type of the metal, while the yield of the powder is proportional to the electricity compressed. Therefore, it is easy to control the amount of dispersion, as well as the grain size, of the metal powder, by altering various electrical factors and the cut-number.

In the method of this invention, the thin films of a hydrocarbon fuel filling the gaps among the metal pellets are decomposed or "cracked" by the discharge energy. Thus, at the same site as the sparking point, both the fragmentation of the metal grains and the cracking of the hydrocarbon medium take place simultaneously.

Of the hydrocarbon medium, the portions located at the sparking points are cracked into a gaseous phase and carbon, and the gas so formed is withdrawn from the reaction system, while the carbon precipitates within the medium. As determined by X-ray diffraction and with an electron microscope, the above-mentioned carbon is found to be a microfine amorphous carbon, the diameter of which ranges from 20 to 30 millimicrons. Thus, the carbon is highly reactive. Since, as aforesaid, carbon is an element located in the upper left section of the Periodic Table of the Elements, it can be utilized as an effective component of the fuel of the described type. Thus, the fact that such an effective carbon is produced by cracking devoid of the atmosphere and in an amorphous state, which means the highly reactive state, constitutes a second vital feature of the method of this invention.

Furthermore, it should be noticed that, in accordance with the present invention, both a microfine metal powder and a carbon powder are produced in the absence of the atmosphere. This fact constitutes a third exclusive feature of the present invention, which has not been true with the conventional techniques.

Thus, the finer the metal grain becomes, the larger become the surface areas of the grain in proportion and, hence, the higher are its activities.

When the outer atmosphere is an inert gas, the surface of the particle, which has a high activity, absorbs the gas and accordingly its activity is reduced.

In case the atmosphere is oxidative, the resulting oxidation causes the activity of the particle to be considerably reduced because the above-mentioned metals, which are employed as metallic fuel components, are highly reactive. The reduction in activity of the particle results in a reduced reactivity, which in turn causes a reduction in combustion velocity and specific thrust of the fuel. Thus, the adaptability of the powder to high energy, high specific thrust fuels, such as jet fuels, rocket fuels, etc., is sacrificed.

A fourth salient feature of the method of this invention is that it is made easy thereby to disperse and incorporate the above-mentioned metals in highly viscous media such as the high molecular weight fuel-binders used in mixed propellants. Thus, it is an established practice to incorporate the microfine powders of Al, Mg, Be and the like in fuels for use as mixed high energy rocket fuels. Those powders not only increase the calorific value of such a fuel, but also serves to stabilize its combustion.

A mixed propellant means a fuel made by molding a finely divided solid oxidant with a high polymer fuel-finder, and such a propellant fuel can be readily molded in substantially any size and possesses good mechanical strength, chemical stability and combustibility.

It is for those reasons that propellants of this type have been widely employed as a medium for large-sized rockets.

It is a difficult task, however, to uniformly disperse a finely divided metal such as Al, Mg or Be in a highly viscous high polymer fuel-binder (e.g., polyethylene, acrylic resin, etc.), because it is not only difficult to handle such a finely divided metal as mentioned before, but the high polymer medium has a poor fluidity and therefore, the powder cannot easily be dispersed therein. Thus, the conventional techniques are disadvantageous, in both time and equipment. However, in accordance with the present invention, which employs a spark discharge, it is quite easy to prepare and simultaneously uniformly disperse a microfine powder of a metal in a high polymer fuel-binder. This is because the impact energy of the spark discharge not only produces a microfine powder of the metal, but also serves to disperse the powder uniformly into the binder.

A fifth, important feature of the method of this invention is that in the course of production of such a microfine powder, there can be no infiltration of impurities. Thus, the fragmentation of the metal in the hydrocarbon fuel is effected exclusively by the electrical energy.

In the conventional methods, which involve the steps of heating, evaporation, reduction, storing and admixing, infiltration of impurities is inevitable. Thus, the beneficial effect of the present invention is particularly pronounced in the field of rocket and jet fuels which demand a high degree of precision and purity.

The present invention will be described in farther detail, reference being had to the accompanying drawing, which shows a typical equipment to be employed in the method of this invention. In a reactor 1 made of an electrically insulating material, in which is disposed a pair of electrodes 2 and 3. It is to be understood that there may be a plurality of such pairs of electrodes for commercial purposes. The electrodes are preferably made of the same material as the metal to be fragmented and dispersed, but since the loss of the material forming the electrodes is only as much as about 0.5 percent of the yield of a microfine powder obtainable, the electrodes may be made of other metals which can be easily handled, such as copper and iron. The reactor 1 is supplied with a liquid hydrocarbon fuel 4. A discharge voltage circuit in the illustrated embodiment is a quenched spark gap oscillator adapted to yield a large number of spark discharges per unit time under a high discharge energy. The oscillator has discharge gaps G, which are connected in series to the electrodes 2 and 3.

Also in the quenched spark gap oscillator 6 and 7 are contacts leading to a power supply, 8 is a step-up transformer, 9 is a limiting reactor, 10 is a charge-discharge capacitor, 11 is a group of spark discharge gaps G, 12 is an oscillating inductance, 13 is an inductance disposed in parallel to the electrodes so as to make the spark discharges more effective, 14 is a choke coil and 16 and 17 are nondielectric resistor. There is also provided a gas outlet duct 18, which serves to guide the gases formed as part of the hydrocarbon fuel is cracked. 19 is a hopper adapted to feed starting material metal pellets into the reactor, while 20 is an outlet duct for the hydrocarbon fuel and the like. In operation, after the hydrocarbon fuel 4 is fed into the reactor 1, metal A, in the form of coarse pellets or grains, measuring from about 5 to 50 mm., is placed in the reactor. Now, as a discharge voltage is impressed across the electrodes 2 and 3 with the quenched spark gap oscillator, there arises a series of spark discharges among the coarse metal pellets, and the resulting discharge energies scrape microfine fragments off the surfaces of the metal pellets. Since the discharge is repeated in a pulsating pattern, the yield of said microfine metal fragments increases with the duration of discharge.

As has been pointed out, at the sparking points, the fragmentation of the metal pellets and the cracking of part of the hydrocarbon fuel 4 filling the interstices among the pellets take place simultaneously.

The hydrocarbon fuel, when cracked, is converted into gases and carbon, and the former are led out of the reaction system through the gas outlet duct 18, while the carbon remains in the hydrocarbon fuel. Thus, the microfine particles scraped off the metal pellets, as well as the carbon produced as part of the hydrocarbon is cracked, are uniformly dispersed in the fuel by the impact pressure created by the discharges. The discharging is suspended when the yield of the microfine powder in the hydrocarbon has reached a predetermined level. When the metal particles and carbon particles so produced in the hydrocarbon fuel have reached 50 to 60 percent, or more, relative to the latter, the whole composition becomes a high energy fuel. The metal particles in the hydrocarbon medium must remain stable for an extended period of time and have good fluidity. Therefore, surface active agents and other additives may be further incorporated in the composition so as to improve the stability and fluidity of the metal and carbon particles. The following is a typical embodiment of the method of this invention, in which a JP fuel, which is a petroleum type jet fuel, is used as a medium in which microfine powders of aluminum and carbon have been dispersed.

Dimensions of the reactor—200 mm. (dia.) by 1000 mm.
Material of the reactor—polypropylene
Material of the electrodes—aluminum
Shape of the electrodes—200 mm. (dia.) by 100 mm.
Spacing of the electrodes—800 mm.
Source voltage—220 v.
Discharge voltage—20 kv.
Source frequency—60 c./s.
Frequency of discharges—6 per ½ cycle
Amount of JP fuel in reactor—13 l. (10.4 kg.)
Amount of Al pellets—12 kg.
Average size of Al pellets—10 mm.
Yield of microfine Al powder—5 kg./hr.
Average size of Al particles—0.3 micron
Yield of carbon—0.5 kg./hr.
Size of carbon—20 millimicrons
Power consumption—22 kwh.
JP fuel cracked—1.1 kg./hr. carbon: 0.5 kg./hr.
gases: 0.6 kg./hr.

Proportions of various materials in reactor after 1 hour of reaction.

JP fuel—63.0% by weight
Al powder—35.7%
Carbon powder—1.3%

Proportions of various materials in reactor after 2 hours of reaction.

JP fuel—47.6% by weight
Al powder—52.0%
Carbon powder—0.4%

Figure 2:
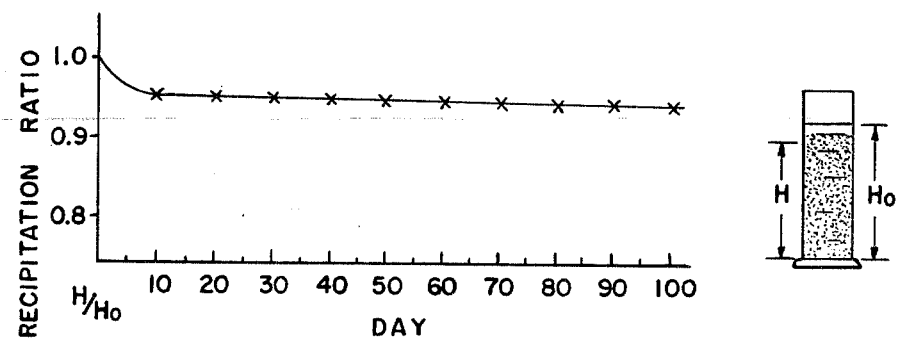
FIG. 2 is a graphic representation of the relationship of standing period and precipitation ratio for a high-energy, high specific thrust fuel produced by the method of this invention.

FIG. 2 shows the sedimentation ratios and the standing periods in days for the fuel obtained after 2 hours of reaction (composition: aluminum powder 52.0%, carbon 0.4%, JP fuel 47.6%).

This invention is not limited to the above mentioned procedures, general liquid hydrocarbons and metals such as Li, Be, C, Na, Mg, Al and Si are applicable to this invention. In this case, the range of specific gravity of metals to be dispersed is 0.5–0.9 and the particle diameter range is $1\mu$–$0.001\mu$.

Figure 3:
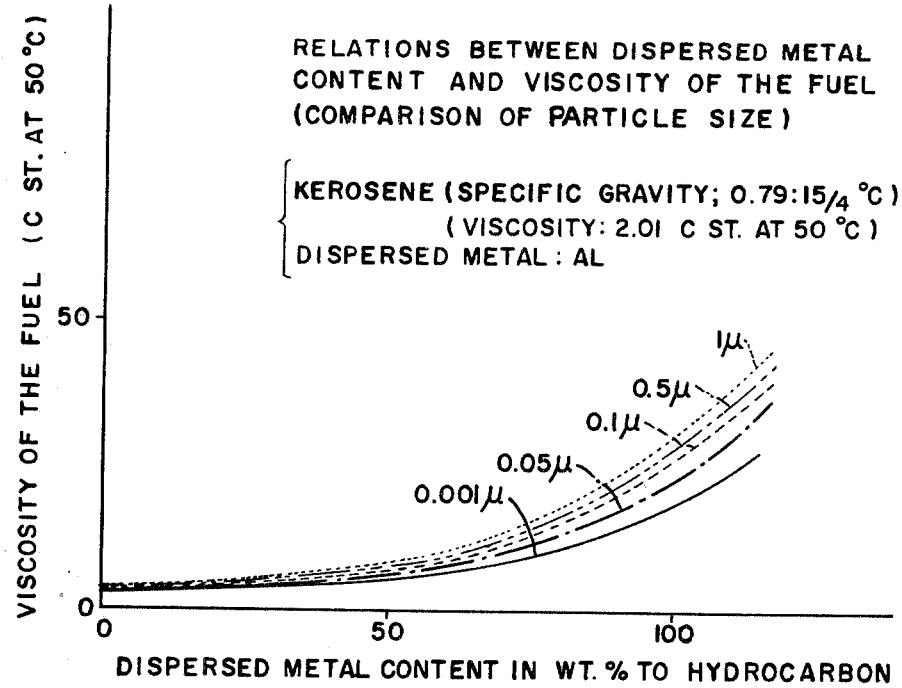
FIG. 3 shows the relations between dispersed metal content and viscosity of the fuel prepared from kerosene as hydrocarbon and aluminum as suspended metal and FIG. 4 shows the relations between dispersed metal content and specific gravity or flash point of the above mentioned fuel.
Figure 4:
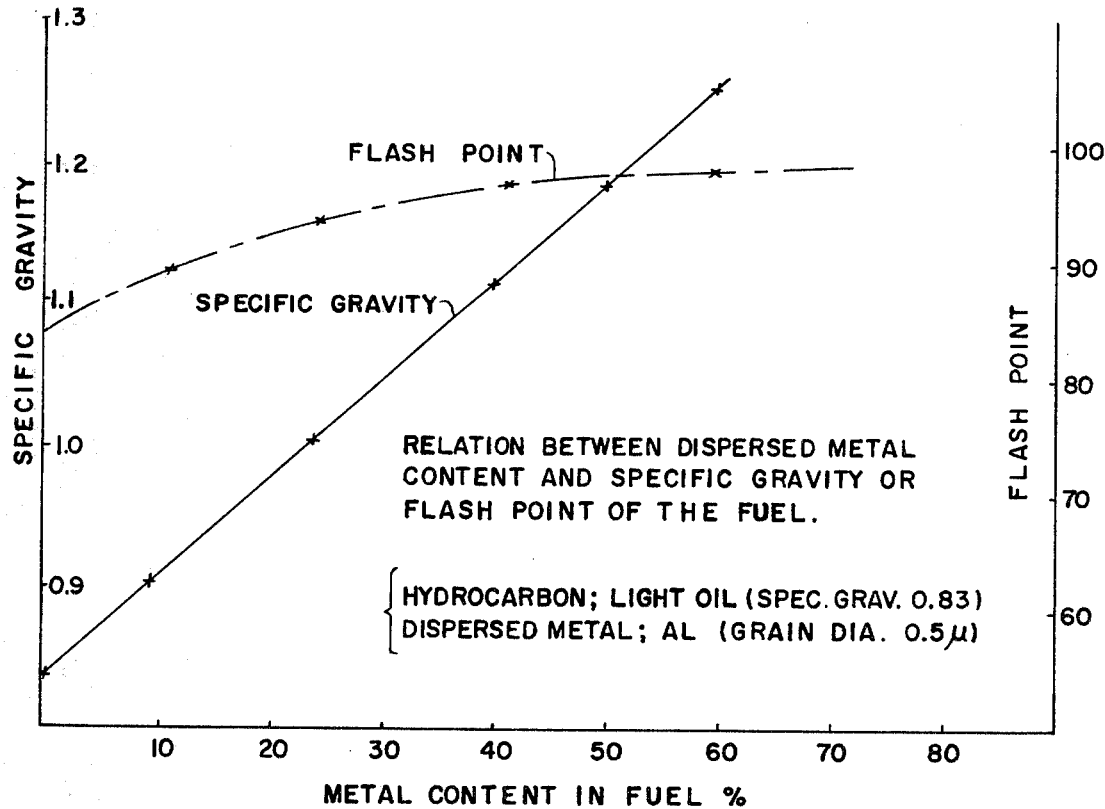

The smaller the particle size is, the more effective the fuel is. Accordingly the most desirable diameter of comminuted metals is $0.001\mu$, which is minimum one in this invention. FIG. 3 shows that it is desirable to make the metal particle smaller in view of the viscosity and fluid-resistance of the fuel. In addition FIG. 3 and FIG. 4 show the variations of specific gravity, viscosity and flashpoint of the fuel, but in regard to neutralization value, corrosiveness and fluidpoint, there is no difference between the fuel produced in this invention and hydrocarbon itself.

It will be apparent that the high energy fuels produced by the method of this invention is quite satisfactory in dispersion stability. Thus, this invention is quite unique and beneficial as a method for the production of high energy fuels.

I claim:

1. A method for the production in a reactor a high energy, high specific thrust fuel for uses such as in jet and rocket engines, comprising the steps of: dispersing pellets selected from the group consisting of metals, alloys, carbon, and intermetallic compounds thereof in a fluid hydrocarbon fuel, immersing at least one pair of electrodes spaced within said hydrocarbon and pellet mixtures, impressing a series of spark discharge voltages across said electrodes, thereby inducing an intermittent series of spark discharges among said pellets devoid of exposure to air, until the said pellets are comminuted into microsize particles and the said hydrocarbon-fuel is cracked simultaneously into gases and carbon particles and dispersion of the said fragmented microsize particles and of the said fragmented gases and carbon particles occurs.

2. The method of claim 1, wherein the pellet is selected from the group consisting of lithium, beryllium, barium, carbon, sodium, magnesium, aluminum and silicon, and intermetallic compounds thereof, the specific gravity range of the said pellets being from 0.5 to 0.9.

3. The method of claim 1, wherein the particle size of said pellets suspended in the hydrocarbon is from $1\mu$ to $0.001\mu$ in diameter.

4. The method of claim 1, wherein the fluid hydrocarbon is selected from the group consisting of liquid hydrocarbons, fuel oils and polymer powders.

5. The method of claim 1, wherein the electrodes employed are made of the same material as the pellets selected.

6. A method for the production in a reactor a high energy, high specific thrust fuel for uses such as in jet and rocket engines, as claimed in claim 6, said step of impressing said spark discharges being carried for about two hours until the relationship of the standing period in days and the precipitation ratio are achieved under conditions equivalent to the use of 52% Al, 0.4% C and 47.6% petroleum fuel, as expressed in FIG. 1.

7. A method as claimed in claim 1, said step of impressing said spark discharges being carried out with the relationship between said pellets in dispersion and the specific gravity and flash point of the fuel is achieved in accordance with FIG. 4.

8. A method as claimed in claim 1, said hydrocarbon fuel comprising kerosene as said fuel and aluminum as said pellets, said step of impressing said spark discharges being carried out until the relationship between the dispersed content of said aluminum and the viscosity of the fuel is achieved as expressed in FIG. 3.

9. The method as claimed in claim 1, said steps being performed under conditions proportional to the following data, wherein the pellets are aluminum and the hydrocarbon fuel is a petroleum jet fuel and the:

Dimensions of the reactor—200 mm. (dia.) by 1000 mm.
Material of the reactor—polypropylene
Material of the electrodes—aluminum
Shape of the electrodes—200 mm. (dia.) by 100 mm.
Spacing of the electrodes—800 mm.
Source voltage—220 v.
Discharge voltage—20 kv.
Source frequency—600 c./s.
Frequency of discharges—6 per ½ cycle
Amount of JP fuel in reactor—13 l. (10.4 kg.)
Amount of Al pellets—12 kg.
Average size of Al pellets—10 mm.
Yield of microfine Al pellets—5 kg./hr.
Average size of Al particles—0.3 micron
Yield of carbon—0.5 kg./hr.
Size of carbon—20 millimicrons
Power consumption—22 kwh.

JP fuel cracked—1.1 kg./hr. $\begin{cases} \text{carbon: 0.5 kg./hr.} \\ \text{gases: 0.6 kg./hr.} \end{cases}$ with proportions of various materials in said reactor after one hour of reaction being JP fuel—63.0% by weight
Al powder—35.7%
Carbon powder—1.3% with proportions of various materials in said reactor after two hours of reaction being JP fuel—47.6% by weight
Al powder—52.0%
Carbon powder—0.4%.

10. The method as claimed in claim 1, further including the step of adding surface active agents to said mixture.

11. The method as claimed in claim 1, said step of impressing said voltages being carried out until the proportion of said particles relative to said fuel reaches at least about 50%.

12. The method of claim 1, the size of said pellets being between about 5 to 50 mm.

References Cited

UNITED STATES PATENTS

| | | | |
|---|---|---|---|
| Re. 25,277 | 10/1962 | Toulmin | 149—87 X |
| 2,934,331 | 4/1960 | Walsh et al. | 149—87 X |
| 2,968,917 | 1/1961 | Whaley | 149—87 X |
| 2,986,456 | 5/1961 | Toulmin | 149—87 |
| 3,069,854 | 12/1962 | Toulmin | 149—87 |
| 3,167,525 | 1/1965 | Thomas | 149—87 X |
| 3,208,674 | 9/1965 | Bailey | 241—1 |
| 3,243,326 | 3/1966 | White et al. | 149—87 |

BENJAMIN R. PADGETT, Primary Examiner

S. J. LECHERT, Jr., Assistant Examiner

U.S. Cl. X.R.

149—109; 241—16